(12) United States Patent
Polimeni, Jr.

(10) Patent No.: US 9,084,951 B2
(45) Date of Patent: Jul. 21, 2015

(54) FILTRATION OF LIQUID COOLANTS

(71) Applicant: Ralph F. Polimeni, Jr., Reno, NV (US)

(72) Inventor: Ralph F. Polimeni, Jr., Reno, NV (US)

( * ) Notice: Subject to any disclaimer, the term of this patent is extended or adjusted under 35 U.S.C. 154(b) by 0 days.

(21) Appl. No.: 14/598,422

(22) Filed: Jan. 16, 2015

(65) Prior Publication Data
US 2015/0122748 A1    May 7, 2015

Related U.S. Application Data

(63) Continuation of application No. 13/274,652, filed on Oct. 17, 2011, now abandoned.

(51) Int. Cl.
*B01D 37/00*    (2006.01)
*B01D 29/27*    (2006.01)
*B01D 29/90*    (2006.01)

(52) U.S. Cl.
CPC ............... *B01D 37/00* (2013.01); *B01D 29/27* (2013.01); *B01D 29/90* (2013.01)

(58) Field of Classification Search
None
See application file for complete search history.

(56) References Cited

U.S. PATENT DOCUMENTS

| | | |
|---|---|---|
| 1,096,132 A | 5/1914 | Shepherd |
| 3,067,504 A | 12/1962 | Lubben |
| 3,231,490 A | 1/1966 | Fry |
| 3,481,479 A | 12/1969 | Hoskins |
| 3,659,718 A | 5/1972 | Brociner |
| 4,116,838 A | 9/1978 | Lazzarotto |
| 4,133,769 A | 1/1979 | Morgan |
| 4,253,959 A | 3/1981 | Tafara |
| 4,279,294 A | 7/1981 | Fitzpatrick |
| 4,478,714 A | 10/1984 | Blake |
| 4,552,661 A | 11/1985 | Morgan |
| 4,917,661 A | 4/1990 | Tirp |
| 4,919,805 A | 4/1990 | Johnson |
| 5,139,672 A | 8/1992 | Ohbayashi |
| 5,186,828 A | 2/1993 | Mankin |
| 5,267,711 A | 12/1993 | Perreault |
| 5,376,271 A | 12/1994 | Morgan |
| 5,543,063 A | 8/1996 | Walker |
| 5,626,746 A | 5/1997 | Rose |
| 5,755,962 A | 5/1998 | Gershenson |
| 6,168,710 B1 | 1/2001 | Martinez Mugica |
| 6,274,036 B1 | 8/2001 | Ellis |
| 6,688,562 B1 | 2/2004 | Harvey |
| 6,755,879 B2 | 6/2004 | Watvedt |
| 6,908,550 B2 | 6/2005 | Silverstein |
| 7,080,756 B2 | 7/2006 | Cunningham |
| 7,090,772 B2 | 8/2006 | Pearson |
| 7,094,344 B2 | 8/2006 | Shirakawa |
| 7,273,546 B2 | 9/2007 | Meritt-Powell |
| 7,575,675 B2 | 8/2009 | Gopalan |
| 7,857,144 B1 | 12/2010 | Asterlin |
| 7,918,996 B1 | 4/2011 | de Bruijn |
| 7,922,905 B2 | 4/2011 | Grodecki |
| 8,425,774 B2 | 4/2013 | Grodecki |

(Continued)

*Primary Examiner* — Robert Popovics
(74) *Attorney, Agent, or Firm* — William H. Eilberg (57) ABSTRACT

A coolant for a machine is filtered by passing some of the coolant into a discharge tube having an opening, the discharge tube supporting a filter bag. Coolant flowing into the discharge tube flows out of the tube through the opening, and then through the bag, and the filtered fluid is recirculated. An end piece, pivotably mounted to the discharge tube, prevents the bag from falling off while in operation, but can be pivoted to a position which facilitates insertion and removal of the bag. When filled, the bag can therefore easily be removed and replaced with a new bag. The invention greatly simplifies the process of filtering a coolant fluid.

8 Claims, 6 Drawing Sheets

(56) References Cited

U.S. PATENT DOCUMENTS

| | | |
|---|---|---|
| 8,540,079 B2 | 9/2013 | Yoshida |
| 2001/0030159 A1* | 10/2001 | Warren et al. ................. 210/695 |
| 2003/0057145 A1* | 3/2003 | Jensen ........................... 210/121 |
| 2007/0209342 A1 | 9/2007 | Cho |
| 2009/0101569 A1 | 4/2009 | Yoshida |
| 2013/0092641 A1* | 4/2013 | Polimeni, Jr. ................. 210/805 |
| 2013/0206580 A1* | 8/2013 | Marburger ..................... 203/41 |

* cited by examiner

FILTRATION OF LIQUID COOLANTS

CROSS-REFERENCE TO PRIOR APPLICATION

This is a continuation of U.S. patent application Ser. No. 13/274,652, filed Oct. 17, 2011.

BACKGROUND OF THE INVENTION

The present invention relates to filtration of liquid coolants used with milling machines and the like. The invention provides a simple and economical way of filtering such coolants, and of replacing the filter when needed.

A milling device or lathe, or the like, produces considerable heat on a workpiece. This heating is countered with a continuous supply of a coolant medium, which is typically provided as a liquid, and sprayed onto the workpiece. The coolant medium is preferably recirculated and re-used.

The operation of the milling device or lathe produces particles which become entrained by, and suspended in, the coolant medium, and which must eventually be removed. In addition, some oil from the machinery will become mixed with the coolant, and should also be removed.

It is important that the flow of coolant not be interrupted while the milling device is operating, to prevent undesirable overheating of the workpiece.

Figure 1:
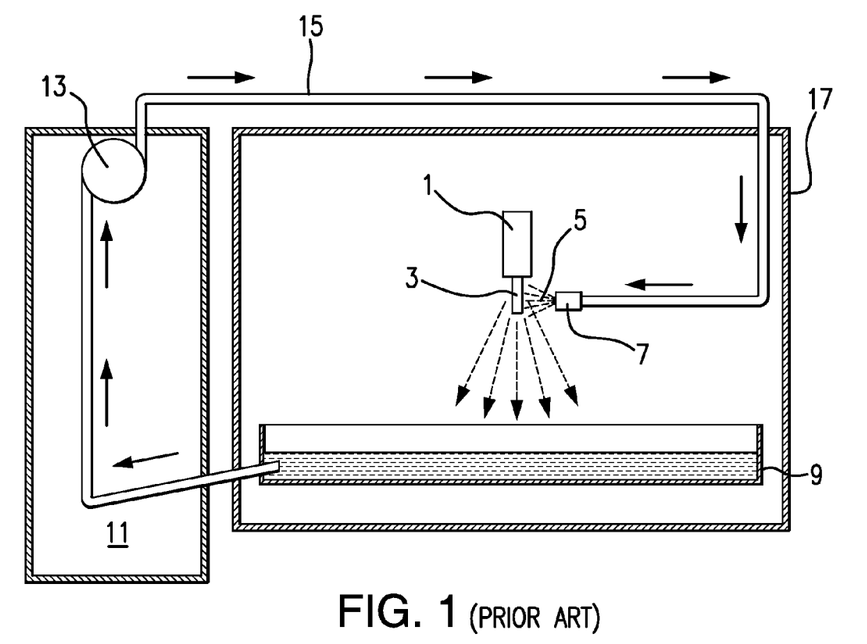
FIG. 1 provides a schematic diagram showing the filtration of coolant in a milling machine, according to the prior art.

A typical arrangement of the prior art is shown in FIG. 1. A milling device or lathe 1 supports a workpiece or tool 3 which is being machined or milled. A liquid coolant 5 is sprayed onto the workpiece through nozzle 7. The coolant falls into reservoir 9 from which the coolant flows, by gravity, into a sump 11. The coolant is recirculated by pump 13, so that the coolant flows through conduit 15, and back into enclosure 17 and into nozzle 7.

The above-described prior art system provides no convenient way of filtering the used coolant fluid. The present invention provides a simple and convenient method and apparatus which substantially improves the prior art arrangement described above. With the present invention, one can easily filter a portion of the coolant flow, and can easily replace the filter when it becomes clogged. Thus, the present invention substantially improves the efficiency of the milling process.

SUMMARY OF THE INVENTION

The present invention includes a system for filtration of a coolant, wherein a conduit supplies coolant fluid to a nozzle, or other delivery means, disposed near a workpiece. A discharge tube, in fluid communication with the conduit, receives some of the flow of the coolant. The discharge tube has an internal channel which allows fluid to flow through the tube. The discharge tube also has an opening, which is preferably a slot, allowing fluid in the internal channel to flow out of the tube. A filter bag is disposed around the discharge tube, and is suspended therefrom. Thus, fluid entering the discharge tube flows out of the tube, through the opening, and into the filter bag, so that the fluid passing through the material of the bag becomes filtered. Filtered fluid falls out of the bag and is then recirculated.

The opening in the discharge tube is preferably a slot which extends along most of the length of the tube. The discharge tube also preferably includes a pivoting end piece, which, in a first position, allows the filter bag to slide easily onto the tube, and in a second position, holds or locks the bag in place after the bag has been inserted.

The discharge tube also includes a mounting block which facilitates the attachment of the tube to a structure, such as a wall of an enclosure housing a machine.

The present invention also includes a valve, which may be part of the discharge tube, or which may be located remotely from the tube, for controlling the flow of fluid into the tube.

The present invention also includes the specific structure of the discharge tube, as described above, and the combination of the discharge tube and the filter bag suspended therefrom.

The invention also includes a method of filtering a coolant for a machine. A discharge tube, having the structure described above, is connected to a supply conduit for coolant. The end piece is positioned parallel to the longitudinal axis of the tube, and a filter bag is positioned on the tube. The end piece is positioned perpendicular to the axis of the tube, so as to lock the filter bag in place. A valve associated with the discharge tube is then opened, allowing fluid to enter the tube, wherein such fluid flows out of the tube and into the filter bag.

When the filter bag becomes filled with particulates, it is necessary to replace the bag. The valve is closed, the end piece is pivoted to the "open" (parallel) position, and the filter bag is removed. A new filter bag is supplied, and the process described above is repeated.

The present invention therefore has the primary object of providing a method and apparatus for filtering a coolant for a machine.

The invention has the further object of enabling a filtration operation to be performed by a simple filter bag which can easily be inserted and replaced when necessary.

The invention has the further object of improving the efficiency of machines, and reducing their cost of operation, by providing a simple and inexpensive method and apparatus for filtering a coolant.

The reader skilled in the art will recognize other objects and advantages of the present invention, from a reading of the following brief description of the drawings, the detailed description of the invention, and the appended claims.

DETAILED DESCRIPTION OF THE INVENTION

The present invention provides an apparatus and method for removing particulates from a coolant medium. As used in this disclosure, the terms "particles" and "particulates" should be interpreted to include both solid particles and liquid contaminants such as droplets of oil.

Figure 2:
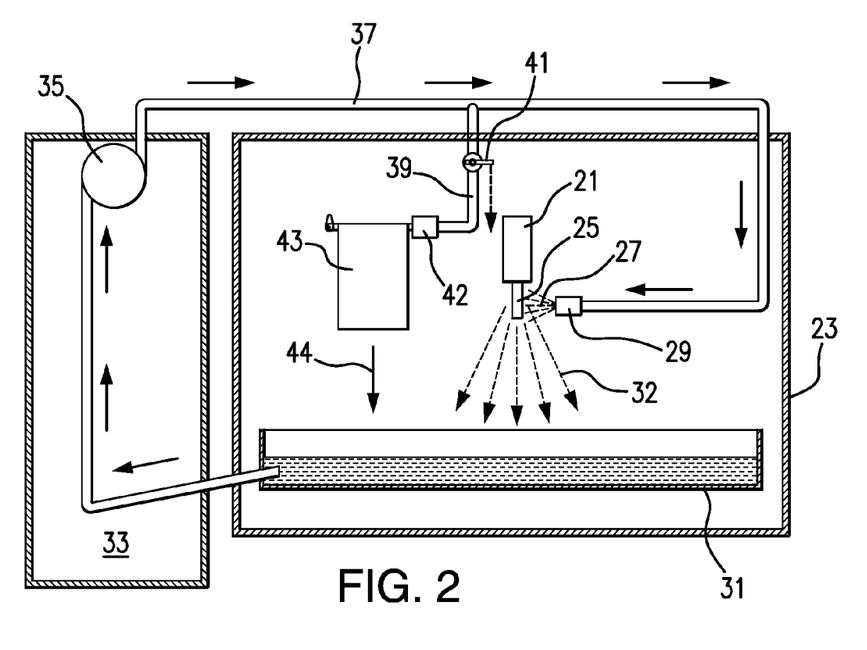
FIG. 2 provides a schematic diagram of a system made according to the present invention.

FIG. 2 provides a schematic diagram showing the operation of the present invention. As in the prior art device of FIG. 1, a milling machine or lathe 21, or the like, is mounted within enclosure 23. A workpiece or tool 25 receives a spray of coolant 27 delivered by nozzle 29. The nozzle therefore comprises a means for delivery of coolant to the workpiece. The used coolant falls by gravity into reservoir 31, as indicated by arrows 32, and then flows by gravity into sump 33. A pump 35 draws the coolant out of the sump, and directs the coolant through conduit 37 for re-use.

In the device of FIG. 2, a portion of the coolant delivered through conduit 37 is diverted into conduit 39. The fluid flow through conduit 39 is controlled by valve 41. The fluid also flows through mounting block or manifold 42, and then flows into a discharge tube, most of which is not visible in FIG. 2. The discharge tube will be described in detail later, with respect to the other figures. A filter bag 43 is fitted onto the discharge tube, and is thereby suspended from the tube. Fluid flowing into the discharge tube flows out of the tube and through the filter bag, and then falls, by gravity, into reservoir 31, as indicated by arrow 44.

Figure 3:
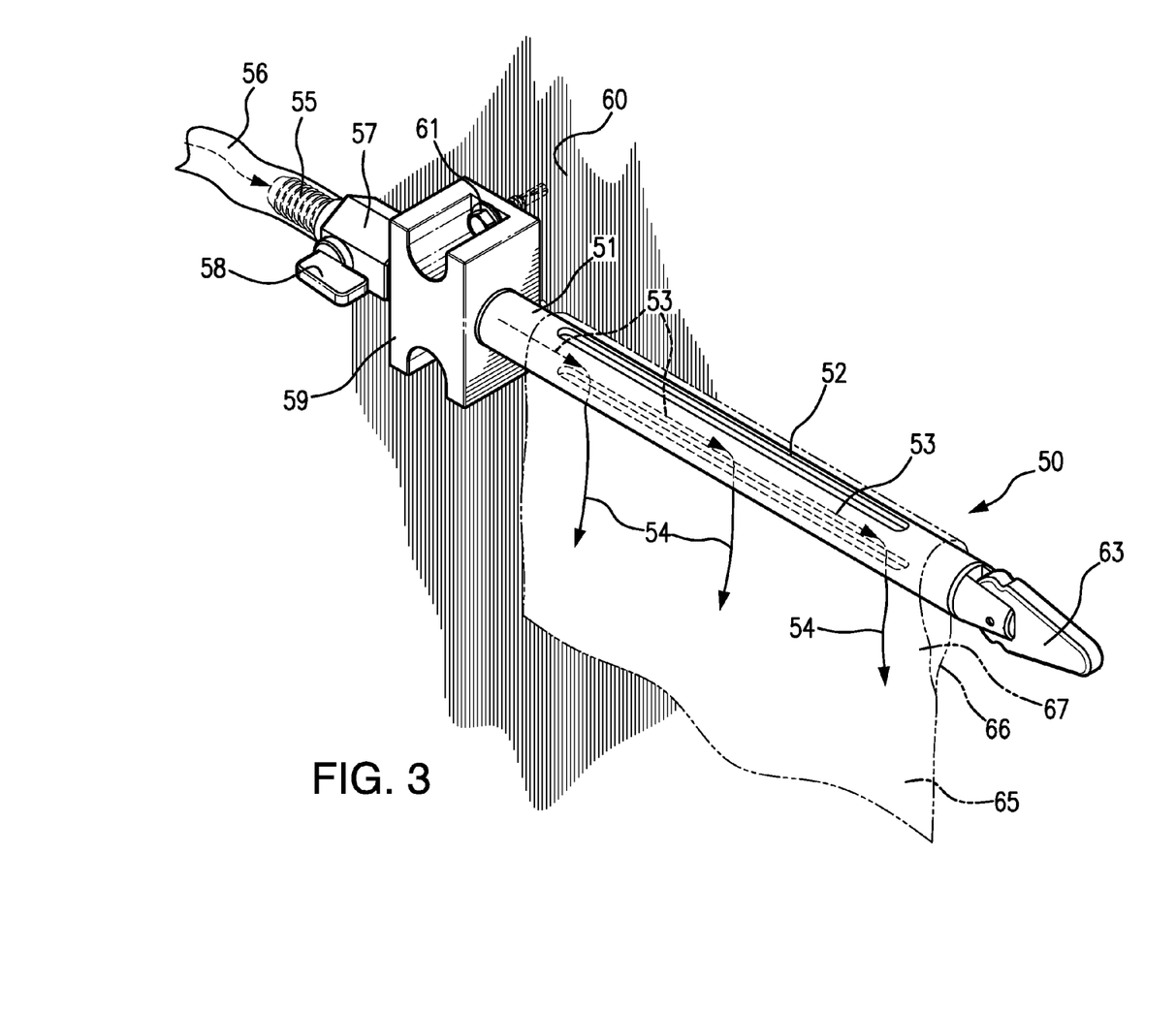
FIG. 3 provides a perspective view showing a portion of the apparatus of the present invention, including a fluid discharge tube and its associated valve, and showing a filter bag, in phantom, inserted over the tube.

FIG. 3 provides a perspective view of the discharge tube 50, and associated components, used in the present invention. The discharge tube comprises a generally cylindrical body 51, the body having a slot 52 which extends along most of the length of the body. Also, the slot extends entirely through the body, in the direction transverse (perpendicular) to the longitudinal axis of the body. The cylindrical body includes an internal channel which permits fluid flow. Fluid flowing inside the cylindrical body can flow out of the tube through the slot. The flow of fluid in the internal channel is represented by arrows 53. Arrows 54 represent fluid that has passed through the slot and is falling by gravity.

The discharge tube 50 includes a hose attachment 55, to which a hose 56 can be affixed. Valve 57 includes knob 58 for controlling the flow of fluid through the discharge tube. A manifold or mounting block 59 provides means for mounting the discharge tube to a wall. In FIG. 3, the mounting block is held by bolt 61, which extends into wall 60, the wall being illustrated in fragmentary form. The wall can be a wall of a room, or the wall of an enclosure, such as may be used to house a machine.

The distal end of the discharge tube, i.e. the right-hand side in FIG. 3, includes an end piece 63 which is pivotably mounted to the body of the tube. A spring-loaded pin (not visible in FIG. 3) engages one of three grooves formed in the end piece (only two of the grooves being visible in FIG. 3). The end piece therefore will preferably assume one of three possible orientations. In one orientation, shown in FIG. 3, the end piece is generally parallel to the longitudinal axis of the tube. In the other orientations, described later, the end piece is generally perpendicular to the longitudinal axis of the tube.

Figure 7:
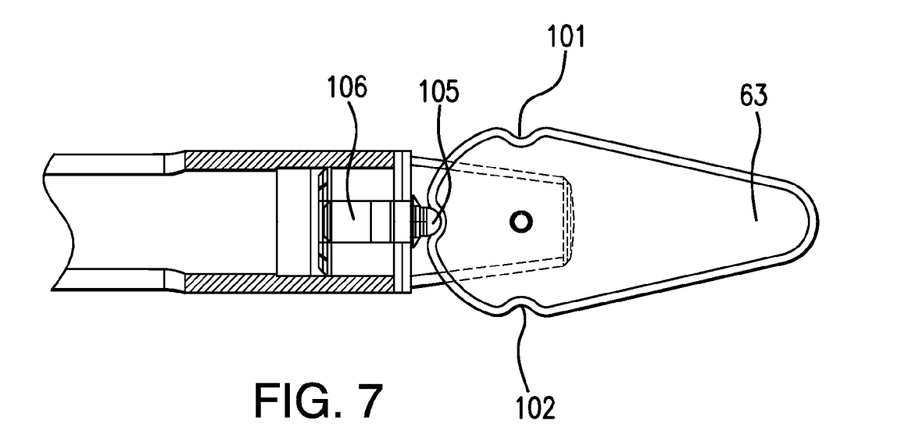
FIG. 7 provides a cross-sectional view of the distal end of the discharge tube of the present invention, showing the end piece in a position parallel to the longitudinal axis of the tube.
Figure 8:
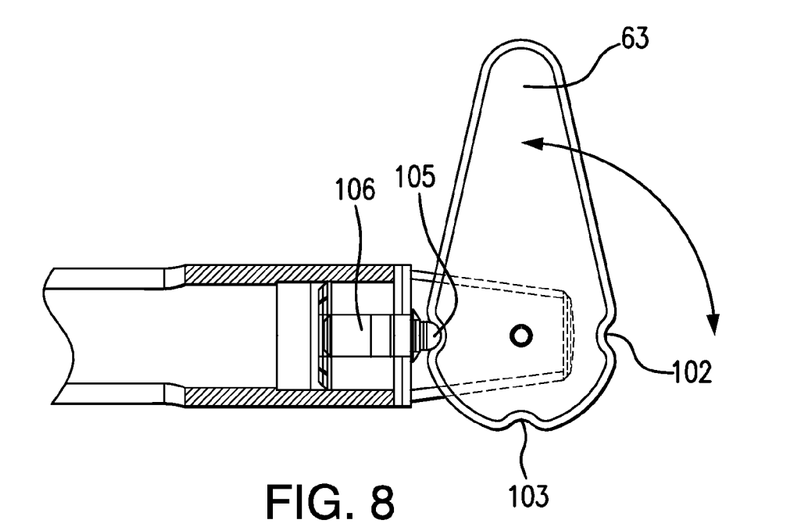
FIG. 8 provides a view similar to that of FIG. 7, except that the end piece has been rotated to a position perpendicular to the axis of the tube.

The structure of the end piece and spring-loaded pin is illustrated in FIGS. 7 and 8. As shown in FIGS. 7 and 8, the end piece 63 includes grooves 101, 102, and 103. A spring-loaded pin 105 is biased by spring 106 such that the pin tends to move to the right, in FIGS. 7 and 8, which is towards the distal end of the discharge tube. The pin thereby engages one of the grooves when the end piece is rotated. Thus, the end piece will preferably lock into one of three positions, defined by engagement of the pin with one of the grooves.

The purpose of the end piece 63 is to facilitate the insertion and removal of a filter bag over the discharge tube.

FIG. 3 shows a filter bag 65, in phantom, inserted over the tube. The filter bag, which may be made of any filtration material, preferably comprises at least two layers which are joined to form an enclosure, but which are open at one end. Thus, the upper end of the bag defines a loop which can be inserted around the body, by sliding the bag onto the discharge tube. Thus, layers 66 and 67 are joined together, by thermal sealing or sewing or any other suitable method, except at the part where the bag is intended to fit over the discharge tube. When the bag has been looped around the body of the tube, the bag is suspended from the tube.

After the bag is inserted over the discharge tube, the end piece 63 can be rotated to one of its perpendicular positions (such as is represented in FIG. 8), thereby tending to prevent the filter bag from sliding off the tube. When it is necessary to remove and replace the filter bag, the end piece can again be rotated to its parallel position, i.e. the position shown in FIG. 3 or 7, to allow the bag to slide easily off the tube.

Figure 4:
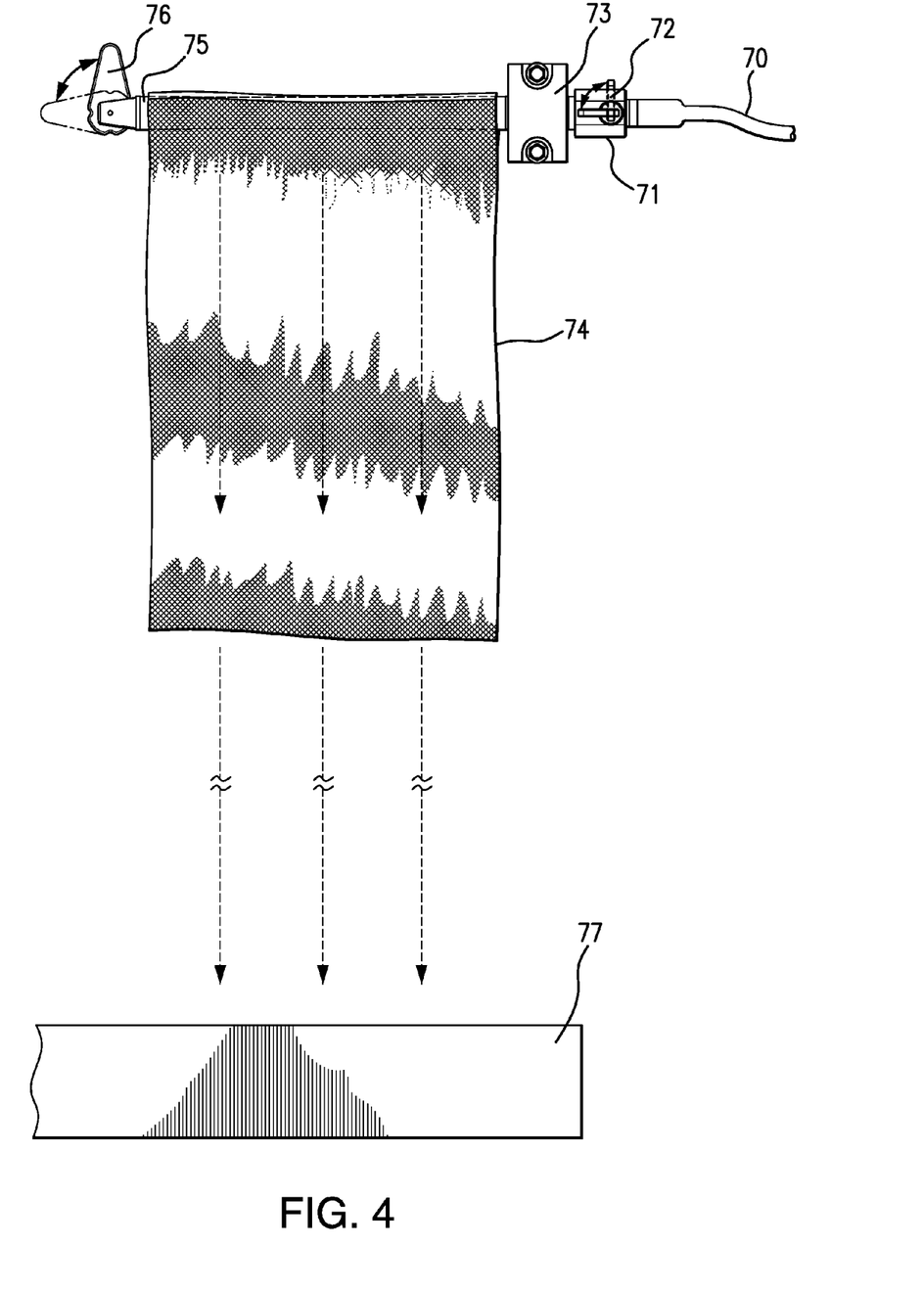
FIG. 4 provides an elevational view, showing the fluid discharge tube of the present invention, with a filter bag suspended therefrom, and illustrating the process wherein filtered liquid falls into a sump or reservoir.

FIG. 4 provides a partially fragmentary elevational view showing the discharge tube, the filter bag, and the reservoir. Fluid is conveyed through hose 70, and flows through valve 71, according to the setting of valve control 72. Manifold or mount 73 connects the tube to a wall or other structure. Filter bag 74 is fitted over the discharge tube 75.

FIG. 4 also illustrates the two possible positions of end piece 76. The position shown in full is the position wherein the end piece is generally perpendicular to the discharge tube, so as to prevent the bag from becoming removed from the tube. The position shown in dotted outline is the position wherein the end piece is generally parallel to the axis of the tube. The latter position allows the bag to be inserted or removed. The end piece has another allowed position, i.e. where the end piece is perpendicular to the tube and facing downward instead of upward.

FIG. 4 also illustrates the flow of coolant, before and after filtration. The coolant fluid flows into the discharge tube, and out of the tube through the slot (not visible in FIG. 4). The fluid is then largely contained within the bag, and flows out of the bag, through the interstices of the filter material. The particles and droplets of oil which were suspended in the fluid become trapped in the bag. The filtered fluid seeps through the pores of the filter material, and thus falls out of the bag and into reservoir 77.

As noted above, the slot 52 preferably extends along most of the length of the discharge tube, so as not to interfere with the flow of fluid coolant out of the tube. The length of the slot should be slightly less than the length of the filter bag, which preferably covers the slot. If the filter bag does not span all of the slot, some fluid will fall out without being filtered. Depending on the specific configuration of the filter bag, the slot could be replaced by some other opening, having a different length or shape, if desired.

Figure 5:
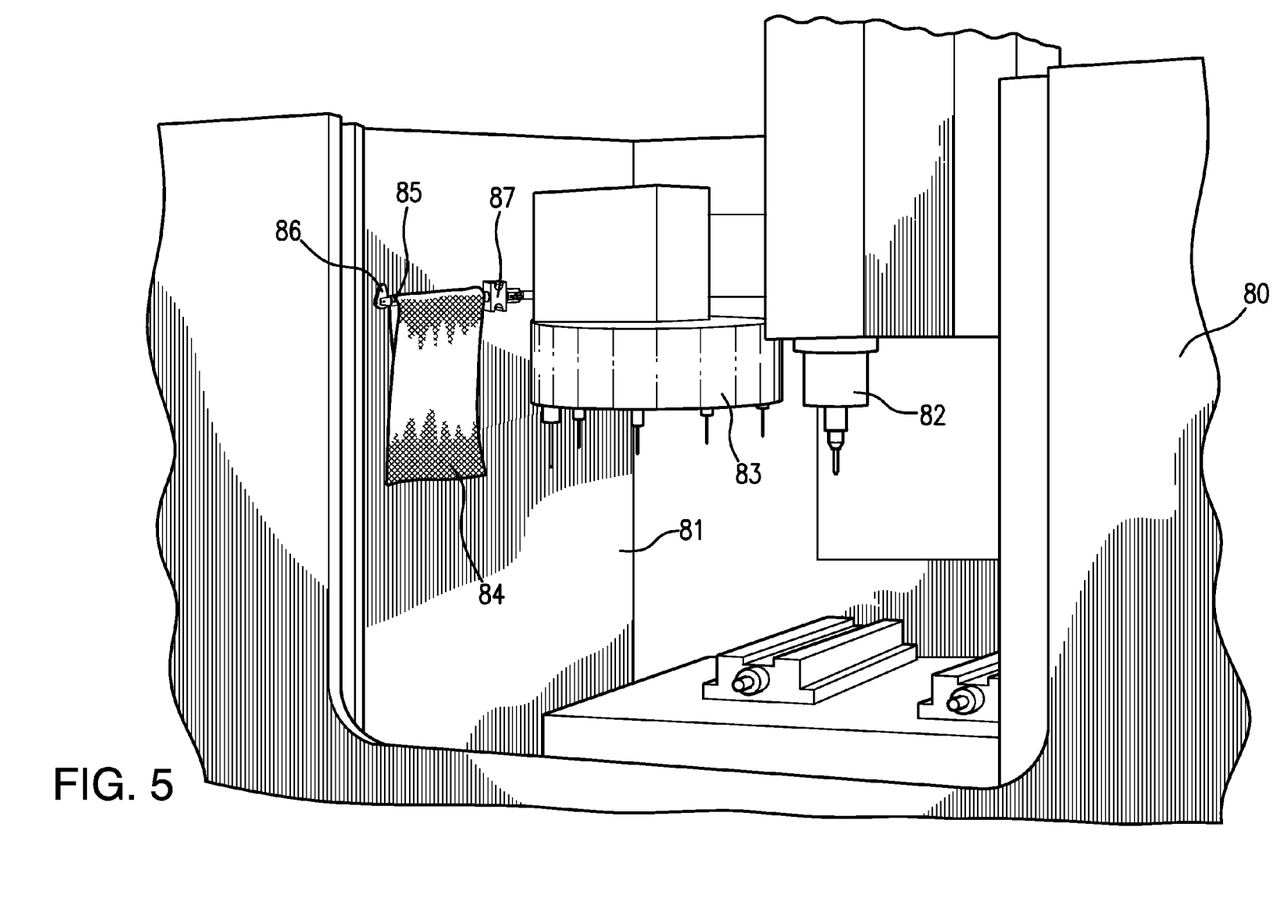
FIG. 5 provides a fragmentary perspective view of part of a typical machine, mounted within an enclosure, and showing the filtration device of the present invention.

FIG. 5 provides a fragmentary perspective view showing the present invention in an environment in which it is typically used. An enclosure 80, including wall 81, houses a milling machine 82 or the like. A coolant distribution device 83 directs coolant fluid onto a workpiece which is being machined. A filter bag 84 is visible at the left-hand side, mounted over discharge tube 85. The figure also shows end piece 86 and manifold or mounting block 87.

In the embodiment shown in FIG. 5, the filter bag is suspended at a relatively high position above the floor level. In the example shown, the machine is completely enclosed during operation, the equipment being controlled entirely by computer. Therefore, in operation, the spraying of coolant makes the inside of the enclosure akin to an operating dishwasher, in which a large amount of fluid is sprayed through much or all of the interior space. Thus, the vertical position of the filter bag is irrelevant, because the amount of fluid flow through the bag is dwarfed by the fluid otherwise being sprayed through the interior of the enclosure. However, if the invention were used in an environment where the machine is not closed off during operation, it might be appropriate to position the bag closer to the floor, to minimize splatter of fluid.

Figure 6:
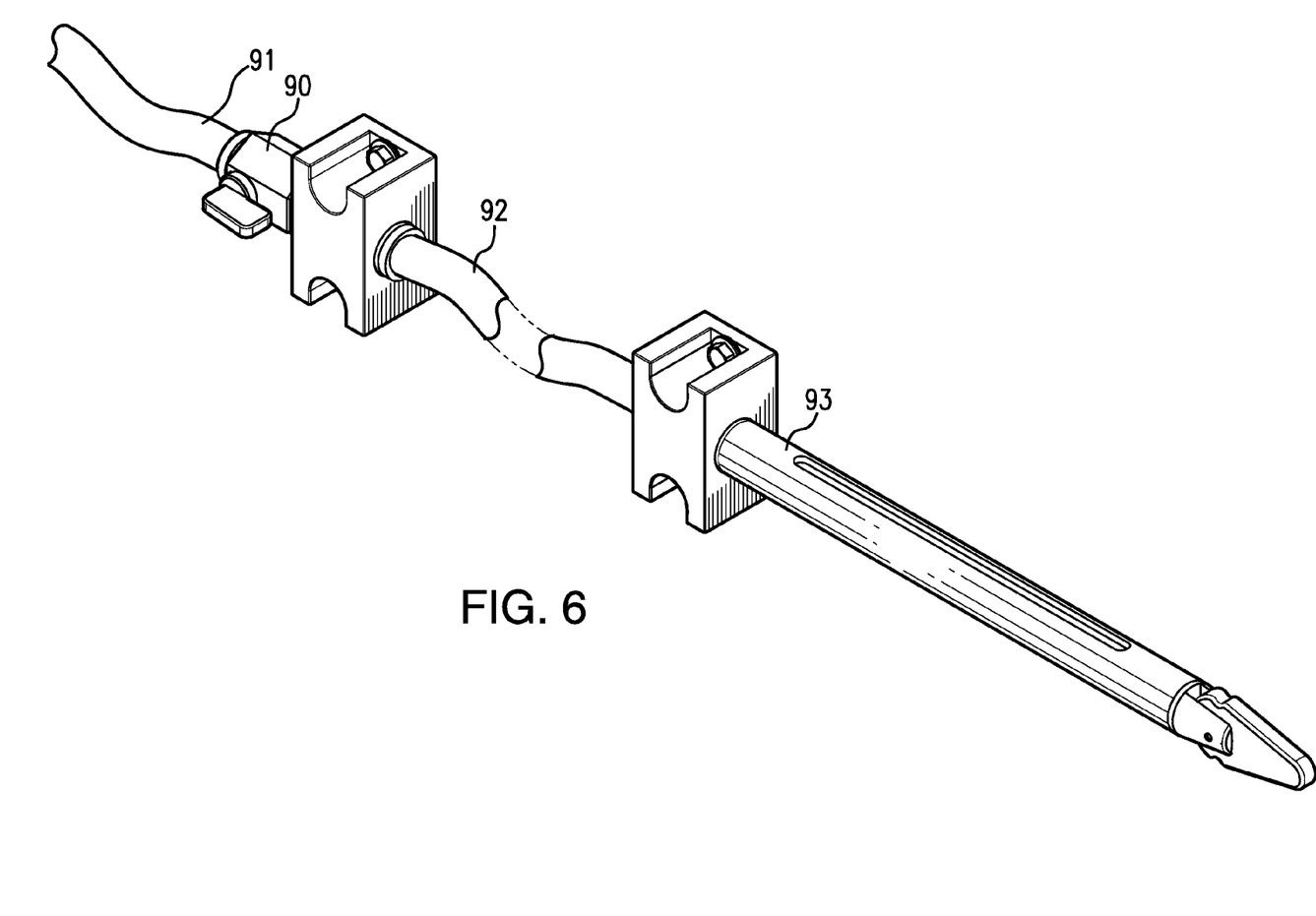
FIG. 6 provides a perspective view of an alternative embodiment, in which the valve is located remotely from the fluid discharge tube.

In the embodiments described so far, the coolant valve has been shown as part of the discharge tube. FIG. 6 shows an alternative embodiment, in which the valve is positioned remotely with respect to the tube. In particular, coolant valve 90 is shown adjacent to hose 91 which introduces the fluid. But another hose 92 separates the valve from discharge tube 93. Except for the position of the valve, the embodiment of FIG. 6 is similar to the other embodiment, and works in substantially the same way.

The present invention includes the method of filtration of a coolant fluid using a filter bag disposed over a discharge tube. The end piece of the discharge tube is positioned to be parallel to the longitudinal axis of the tube. A filter bag is inserted over the discharge tube, and the end piece is rotated to a position which is perpendicular to the axis of the tube. Thus, the bag is held on the discharge tube. Some of the recirculating coolant fluid is directed into the tube. Due to the slot in the tube, the fluid flows by gravity into the bag. The bag traps particles suspended in the fluid, as well as droplets of oil in the fluid, and the filtered fluid flows through the pores in the filter material, and into a reservoir for recirculation.

When the bag becomes filled with particles and/or oil, the end piece of the discharge tube is moved to the parallel position, and the bag is removed from the tube. A new, clean bag is inserted over the discharge tube, and the process is repeated.

As is apparent from FIG. 2, the coolant fluid is simultaneously delivered to the workpiece and to the discharge tube. Thus, the fluid flowing into conduit 39 does not, at any one moment, comprise all of the fluid delivered by the pump. Therefore, not all of the fluid flowing to the nozzle is filtered at once. But because the system recirculates the fluid, the filtered and non-filtered fluid becomes mixed, and after several cycles, virtually all of the fluid can be expected to have passed at least once through the filter.

It is important that the flow of coolant fluid to the workpiece not be interrupted. Therefore, valve 41 is set by opening it just so far as to cause a very slight reduction in flow at the nozzle. Then, the valve may be moved very slightly towards the closed position, so that the flow at the nozzle is the same as it was when valve 41 was closed. In other words, valve 41 is set to allow the discharge tube to receive the maximum practical flow of fluid, without reducing the flow to the nozzle. The proportion of the fluid that goes to the discharge tube is determined by the capacity of the pump and the size of the fluid conduits.

There are two types of preferred fabric material used for the filter bag. Both types are made of polypropylene. The first is a spun bond, and the other is a melt blown fabric. Either type may be used, depending on the application. There may be as many as four layers used to form the bag. Also, the weight of the fabric can vary. While the above-described material is preferred, the invention is not limited to use with a particular type of material.

In FIG. 2, instead of having a single, unbroken conduit leading from reservoir 31 to pump 35, the sump 33 may comprise a separate tank, located at the bottom. The tank would be fed by a shorter conduit which carries fluid from the reservoir. The pump 35 would then lift the fluid from that tank. Either arrangement can be used with the present invention.

The invention can be modified in still other ways. The particular material used to make the filter bag can be varied. The shape of the opening or slot, in the discharge tube, can be modified. The structure of the end piece could be different. The positioning of the device of the invention can be changed.

These and other variations, which will be apparent to the reader skilled in the art, should be considered within the spirit and scope of the following claims.

What is claimed is:

1. A method of filtering a coolant fluid for a machine, the coolant fluid being supplied from a supply conduit, the method comprising:
   a) connecting a discharge tube to the supply conduit, the discharge tube having a longitudinal axis, the discharge tube having a generally cylindrical body defining an internal channel for fluid flow, the discharge tube also having an opening allowing fluid in the internal channel to flow out of the tube, the tube being connected to an end piece which is pivotably mounted to the tube,
   b) positioning the end piece such that the end piece is generally parallel to the longitudinal axis of the tube,
   c) sliding a filter bag onto the discharge tube,
   d) positioning the end piece such that the end piece is generally perpendicular to the longitudinal axis of the tube,
   e) actuating a valve, in fluid communication with the discharge tube, for enabling fluid to flow into the discharge tube,
   wherein fluid entering the discharge tube flows into the filter bag and becomes filtered.

2. The method of claim 1, further comprising:
   f) determining when the filter bag has become filled with particulate material,
   g) actuating the valve to stop fluid flow into the discharge tube,
   h) positioning the end piece as in step (b),
   i) sliding the filter bag off the discharge tube, and
   j) performing steps (c), (d), and (e) with a new filter bag.

3. The method of claim 2, wherein the opening comprises a slot which extends along a length of the body of the discharge tube, and wherein step (c) includes positioning the filter bag such that the bag covers substantially all of the slot.

4. The method of claim 2, further comprising recirculating fluid which has passed through the bag by pumping the fluid into the supply conduit.

5. A method of filtering a coolant fluid for a machine, the method comprising:
   a) continuously conveying coolant fluid from a reservoir, through a supply conduit, and to a nozzle which sprays the fluid onto a workpiece, wherein fluid sprayed from the nozzle then falls by gravity into the reservoir for recirculation,
   b) simultaneously with step (a), withdrawing a portion of the coolant fluid from the supply conduit and directing said coolant fluid into a discharge tube, wherein a filter bag is suspended from the discharge tube, wherein the discharge tube has an opening which allows coolant fluid to flow by gravity from the discharge tube into the filter bag,
   c) allowing the coolant fluid to flow by gravity through pores in the filter bag, and out of the bag and into the reservoir, wherein particulate material in the coolant fluid becomes trapped in the filter bag, and d) determining when the filter bag has become filled with particulate material, and replacing the filter bag with a clean bag when the filter bag has become so filled.

6. The method of claim 5, wherein the discharge tube comprises a generally cylindrical body which has an end piece which is pivotably mounted to the cylindrical body, and wherein the filter bag is suspended from the discharge tube by rotating the end piece such that the end piece is generally parallel to the cylindrical body, sliding the filter bag over the discharge tube, and rotating the end piece so that the end piece is generally perpendicular to the cylindrical body, such that the end piece tends to prevent the filter bag from sliding off of the discharge tube.

7. The method of claim 5, wherein step d) includes rotating the end piece so that the end piece is generally parallel to the cylindrical body, sliding the filter bag off of the discharge tube, sliding a clean filter bag onto the discharge tube, and rotating the end piece so that the end piece is generally perpendicular to the cylindrical body, such that the end piece tends to prevent the filter bag from sliding off of the discharge tube.

8. The method of claim 5, wherein the coolant fluid flows in a single direction, from the reservoir, into the supply conduit, into the discharge tube and the nozzle, and back to the reservoir.

* * * * *